United States Patent [19]

Scott et al.

[11] Patent Number: 4,464,118
[45] Date of Patent: Aug. 7, 1984

[54] DIDACTIC DEVICE TO IMPROVE PENMANSHIP AND DRAWING SKILLS

[75] Inventors: Warner C. Scott; Richard H. Wiggins, both of Dallas, Tex.

[73] Assignee: Texas Instruments Incorporated, Dallas, Tex.

[21] Appl. No.: 160,879

[22] Filed: Jun. 19, 1980

[51] Int. Cl.³ .......................................... G09B 11/00
[52] U.S. Cl. ..................................... 434/85; 434/162; 434/159; 434/335
[58] Field of Search ............... 434/159, 161, 162, 165, 434/167, 169, 314, 116; 340/146.354; 273/85 G, DIG. 28

[56] References Cited

U.S. PATENT DOCUMENTS

| | | | |
|---|---|---|---|
| 3,059,064 | 10/1962 | Lebell | 179/1 SF |
| 3,641,496 | 2/1972 | Slavin | 340/148 |
| 3,728,480 | 4/1973 | Baer | 273/DIG. 28 |
| 3,886,670 | 6/1975 | Lucien et al. | 434/314 |
| 3,956,745 | 5/1976 | Ellis | 340/365 VL |
| 3,996,557 | 12/1976 | Donahey | 340/146.354 |
| 3,996,671 | 12/1976 | Foster | 434/321 |
| 4,020,463 | 4/1977 | Himmel | 340/146.354 |
| 4,126,851 | 10/1982 | Okor | 273/85 G |
| 4,189,779 | 2/1980 | Brautingham | 364/718 |

*Primary Examiner*—Richard C. Pinkham
*Assistant Examiner*—Leo P. Picard
*Attorney, Agent, or Firm*—William E. Hiller; James T. Comfort; Melvin Sharp

[57] ABSTRACT

A didactic device for providing a learning experience and/or entertainment by serving as a learning aid to improve penmanship and drawing skills. The didactic device combines an optical image processing system with a speech synthesis system, wherein a drawing surface is provided in registration with the field of view of an optical imager. The user of the didactic device is requested either visually via a display mounted on the housing of the didactic device in proximity to the drawing surface or verbally via speech synthesis electronics to write or draw something on the drawing surface. When the user has completed the assignment by drawing indicia on the drawing surface, the image processing system, which includes an imager chip, a matrix memory in which signal data output from the imager chip is stored, and a data processor having an object recognition comparator, is actuated. The imager views the indicia as drawn by the user on the drawing surface and provides a signal data output indicative of the appearance of the indicia. The drawn indicia is then compared via the recognition comparator with the particular object configuration stored in memory and corresponding to the drawing instruction given to the user. Based upon the comparison, the speech synthesis system then gives an audible verbal response critiquing the writing or drawing of the user on the drawing surface and may be accompanied by visual showing of the correct drawing on the display.

24 Claims, 8 Drawing Figures

DIDACTIC DEVICE TO IMPROVE PENMANSHIP AND DRAWING SKILLS

BACKGROUND OF THE INVENTION

This invention generally relates to a didactic device or educational teaching aid for providing a learning experience and/or entertainment in which an image processing system is combined with a speech synthesis system in a manner directed toward improvement of the user's penmanship and drawing skills. More particularly, the didactic device includes a drawing surface on which a user executes selected instructions, which may be provided verbally by electronic speech synthesis or visually via a display or both, by drawing indicia on the drawing surface. The drawn indicia is viewed by an imager, compared with data signatures stored in a memory for verification purposes based upon the selected instructions, and vocally and visually critiqued via the speed synthesis system and the display.

Heretofore, educational teaching aids have included speech synthesizer systems therein to enable the teaching aid to audibilize words, phrases and sentences in a human language in providing a learning experience, such as the talking learning aid disclosed in pending U.S. application Ser. No. 901,393 filed Apr. 28, 1978, now U.S. Pat. No. 4,209,836 issued June 24, 1980.

Although such didactic devices have been designed for providing a learning experience in which speech synthesis is an important aspect, more unique forms of educational training aids are constantly being sought to further enhance learning experiences available for various purposes to individuals having diverse formal education backgrounds and intelligence skills ranging from severely limited to exceptional.

Another aspect with which the present invention is concerned involves optical character recognition or verification, wherein the reading of characters on documents is accomplished opto-electronically. Generally, optical character recognition apparatuses function by opto-electronically scanning a character in a rectangular pattern of lines so as to produce quantized binary electronic signals corresponding to the pattern of the character being scanned. The quantized character pattern is stored in a memory and compared on a bit-by-bit basis with character patterns of standard characters such that the unknown character which is scanned is defined as corresponding to the standard character producing the closest similarity thereto.

The combination of an optical character recognition system with a voice annunicator system responsive thereto to produce voice messages corresponding to the message being optically scanned is generally known. See, for example, U.S. Pat. No. 3,641,496 Slavin issued Feb. 8, 1972.

While the foregoing aspects with which the present invention is involved are generally known, prior to the conception of the didactic device disclosed and claimed in pending U.S. application, Ser. No. 153,342 filed May 27, 1980, a useful learning aid combining the features of optical character recognition or verification and audible speed reflective of comprehension of what has been seen has not been developed.

SUMMARY OF THE INVENTION

In accordance with the present invention, a didactic device or learning aid is provided in which an image processing system is combined with a speech synthesizing system, as in the aforesaid pending U.S. application, Ser. No. 153,342, filed May 27, 1980, wherein verbal or visual instructions via electronic speech synthesis or a display are communicated to a user who acts upon the instructions by writing or drawing indicia on a drawing surface provided on the didactic device. The content of the drawn indicia is then viewed by the imager and verified in relation to its response to the selected instructions, and then critiqued by audible verbalization via speed synthesis as to accuracy. The audible verbalization critiquing the drawn indicia may be accompanied by a visual display of the correct indicia for properly responding to the selected instruction.

More particularly, the didactic device comprises an optical image processing system combined with a speech synthesis system, wherein a drawing surface is provided in registration with the field of view of an optical imager. The drawing surface may take the form of a readily erasable paper or a "magic slate" on which the user is to execute writing or drawing instructions as determined by the selected actuation of push-buttons or switches on a keyboard of the didactic device. The didactic device may further include a display mounted on the housing thereof in proximity to the drawing surface. When the user actuates a selected switch on the keyboard, the learning aid prompts the user either visually via the display or verbally via speech synthesis electronics to write or draw something on the drawing surface. Upon completion of the assignment by drawing indicia on the drawing surface, the user then actuates another switch on the keyboard to operate the image processing system which includes an imager chip, a matrix memory in which signal data output from the imager chip is stored, and a data processor having an object recognition comparator. The data processor takes the form of a microprocessor and includes a storage memory in which firmware in the form of data signatures of a plurality of object configurations is retained. The microprocessor includes examination instructions via a programmed read-only-memory for comparing the data signal output of the imager with the particular object configuration in the storage memory within the microprocessor corresponding to the drawing instruction given to the user. The signal data output of the imager is analyzed with the particular data signature as provided by the memory of the microprocessor. Based upon the foregoing analysis, the speech synthesizing system as controlled by the microprocessor gives a verbal response critiquing the writing or drawing of the user on the drawing surface which may also be accompanied by a visual showing of the correct drawing on the display in response to the selected instruction. The speech synthesizing system includes speech synthesis electronics, a vocabulary memory, and a speaker. The speech synthesis electronics is operably connected to the character recognition comparator of the microprocessor for generating an audio output reflective of the content of the analytical signal output from the character recognition comparator of the microprocessor. The vocabulary memory is of the read-only-memory type and contains a multiple number of digitally coded words, phrases and sentences which are accessed selectively by the speech synthesis electronics in response to the particular analytical signal output from the character recognition comparator of the microprocessor. The speaker is connected to the speech synthesis electronics and converts the audio output received therefrom to audible sound. The speech synthesis electronics may take the form of the speech synthesizing integrated circuits disclosed in U.S. Pat. No. 209,836, wherein audio output signals are generated in response to coded digital signals received as an input for conversion to audible speech by appropriate electronics circuitry and a speaker. The memory storage within the microprocessor may be of the random access memory type as controlled by the microprocessor which includes a ROM program providing conversion of the analog signal data output of the imager to digital signals, together with the location and discretizing of the image. In accordance with the present invention, the vocabulary memory of the speech synthesizing system is geared to the application of the didactic device as a learning aid in improving penmanship and drawing skills. To this end, audible verbalizing as accomplished by the speech synthesis system included in the didactic device will contain a series of instructions to write specific "letters" of the alphabet, "arabic numerals", etc. and to draw simple objects, such as a "circle", a "rectangle", a "star", etc. The vocabulary memory of the speech synthesizing system also retains a multiple number of possible critical responses based upon the imager analysis of the indicia drawn by the user on the drawing surface as compared to the requested instruction by the didactic device. Thus, the didactic device in accordance with the present invention serves as a learning aid for improving the penmanship and drawing skills of the user.

BRIEF DESCRIPTION OF THE DRAWINGS

By way of example, and in order to describe various aspect of the invention in greater detail, together with the advantages thereof, reference is made to the drawings, wherein.

DETAILED DESCRIPTION

At the outset, it will be understood that the didactic device in accordance with the present invention represents a more specific application of the broad concept disclosed and claimed in pending U.S. application, Ser. No. 153,342 filed May 27, 1980 wherein a learning aid combining the features of optical character recognition or verification via an image processing system and audible speech via a speech synthesis sytem reflective of comprehension of what has been seen by the imager is set forth. The present didactic device or learning aid has as its specific purpose the aim of improving the penmanship and drawing skills of a user, particularly with emphasis on pre-schoolers and children of lower elementary grades in school to facilitate teaching the appearance of "letters" of the alphabet and "arabic numerals" and how to write such characters or indicia in a proper manner.

Figure 1:
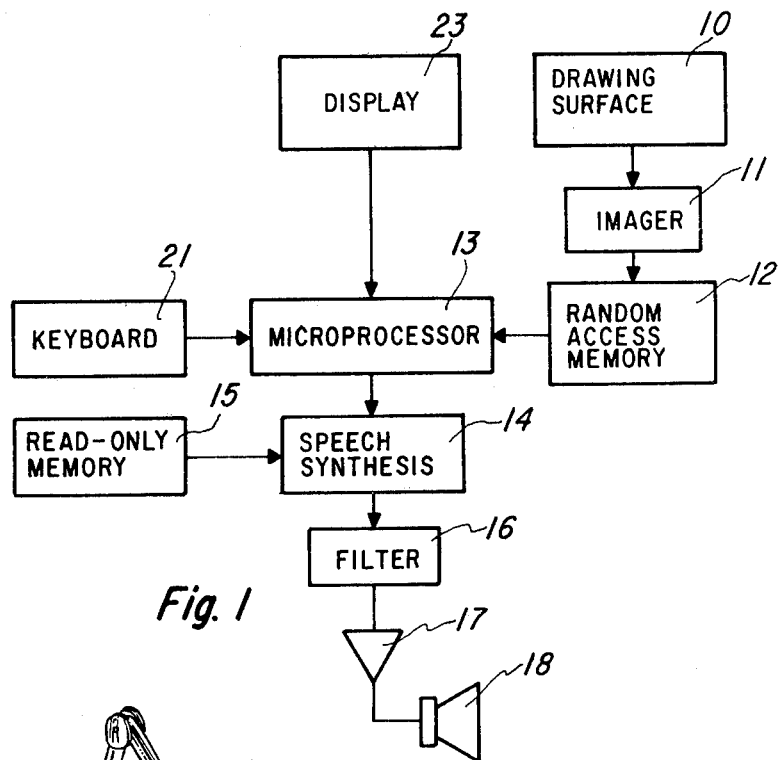
FIG. 1 is a block diagram of a didactic device serving as a learning aid to improve the penmanship and drawing skills of the user, as constructed in accordance with the present invention.

To this end, FIG. 1 illustrates a block diagram of a didactic device or educational teaching aid as constructed in accordance with the present invention for providing a learning experience and/or entertainment with a view toward improving the penmanship and drawing skills of the user. The didactic device of FIG. 1 comprises a composite system, wherein an optical character recognition processing sub-system is combined with a speech synthesis sub-system, such that a drawing surface 10 is arranged to lie within the field of view of a visual detector means in the form of an optical imager 11 of the optical character recognition processing sub-system. The drawing surface 10 may be provided by any suitable means, such as, for example, a so-called "magic slate" comprising a translucent sheet of plastic material disposed upon a black or colored heavy weight backing layer, such as heavy cardboard, covered with a suitable wax coating. Such a "magic slate" may be repeatedly used for drawing indicia upon the thin plastic translucent sheet by marking thereon with a stylus such that the black or colored surface of the underlying heavy weight backing layer appears through the thin translucent sheet. Markings are "erased" from the "magic slate" by lifting the thin translucent plastic sheet away from the surface of the wax-coated backing layer. It will be understood, however, that the drawing surface 10 may be provided by any suitable means, such as a paper tablet or an electronic writing screen upon which removable markings can be made to appear by use of a "light pen".

The imager 11 may be in any one of several suitable forms, such as an electronically scanned photosensor, i.e. a television camera vidicon; a mechanically scanned photosensor, wherein movement of a sensor or mirror across a field of view is accomplished by mechanical means; photographic films; or a "staring" multiple element array, such as an array of charge coupled devices or any matrix array having a plurality of discrete points. In a preferred form, the imager 11 may be a charge coupled device imager array on a single imager chip containing 32×32 array elements in the matrix. The image processing sub-system further includes a memory 12, and a data processor in the form of a microprocessor 13 having a character recognition comparator incorporated therein. The memory 12 is preferably of the random access type having a storage capacity capable of accepting the signal data output from the imager 11. Thus, the random access memory 12 may have a small storage capacity, e.g. of 32×32 bits corresponding to the array of imager cells. The random access memory or RAM 12 is connected to the output of the imager 11 and is arranged in columns and rows of bits which may be designated as pixels with white pixels being of a "0" binary value and black pixels being of a "1" binary value. Thus, the contents of the RAM 12 constitute a digital image of the image received on the viewing face of the imager 11 corresponding to an object disposed in the field of view, in this instance the indicia or characters marked, drawn or written upon the drawing surface 10. The microprocessor 13 acts as a central processor unit for the optical character recognition processing sub-system and the speech synthesis sub-system. The microprocessor 13 includes a microcontroller for examining the contents of the RAM 12. The microprocessor 13 further includes a read-only-memory (ROM) which contains a program with instructions for controlling the microprocessor. The ROM may provide for analog-to-digital conversion of the image signal data, followed by the location and discretizing of the image, i.e. the location of discrete objects in the field of view of the imager 11, where any such object is, and how tall the object is. The microprocessor 13 further includes a random access memory RAM for data storage during its computing operations, wherein data signatures of a multiple number of object configurations, e.g. "letters" of the alphabet and "arabic numerals", are stored in the form of firmware for comparison with the digital data comprising the image as stored in the RAM 12. To this end, the microprocessor 13 includes analyzer means in the form of a character recognition comparator as part of the data processing capability thereof, the character recognition comparator producing an analytical signal output determinative of the comparative analysis between the digital image data from the RAM 12 and the firmware stored in the RAM of the microprocessor 13. The microprocessor 13 may be a TMS 8080 microprocessor or a TMS 9980 microprocessor as manufactured by Texas Instruments Incorporated of Dallas, Tex., or any suitable microprocessor depending upon the degree of complexity desired for the didactic device. In this sense, it will be understood that any suitable optical character recognition apparatus could be employed as the image processing sub-system of the didactic device, although a relatively unsophisticated optical character recognition subsystem is preferred for economic considerations. A more sophisticated optical character recognition apparatus may be employed, however, such as that disclosed and claimed in pending U.S. patent application, Ser. No. 115,986, filed Jan. 28, 1980, now U.S. Pat. No. 4,415,880.

As described hereinbefore, the optical character recognition processing sub-system is combined with a speech synthesis sub-system which includes speech synthesis electronics 14, a vocabulary memory 15 and sound conversion circuitry connected to the output of the speech synthesis electronics 14, wherein the sound conversion circuitry may include an appropriate low pass filter 16, an audio amplifier 17 and a speaker circuit 18 of a suitable type for converting the audio output from the speech synthesis electronics 14 to sound energy. By way of example, the speech synthesis electronics 14 may employ a linear predictive coding technique preferably including a speech synthesis semiconductor chip, such as the TMC 0280 speech synthesis chip manufactured by Texas Instruments Incorporated of Dallas, Tex. This chip operates from sequentially called single frames of digitally stored speech intelligence and is of a type disclosed in the aforesaid U.S. Pat. No. 4,209,836. This particular speech synthesis technique utilizes an electronically alterable model of the human vocal track which is configured by digital input. Along with the digital configuration input, pitch and other excitation digital control signals are applied to generate an analog signal representing the audio sound requested and identified by the digital information input to the speech synthesis chip 14 via the vocabulary memory 15 which preferably is of a read-only type. Previously digitally coded speech (which may be words, phrases, and sentences, for example) is stored in the vocabulary memory 15 and applied to the speech synthesis chip 14 as required in response to the accessing thereof via the speech synthesis chip 14 as determined by the analytical output signal from the character recognition comparator of the microprocessor 13. It will be understood that other suitable forms of speech synthesis systems may be employed in the didactic device according to this invention.

Heretofore, except for the description of the drawing surface 10, the components of the didactic device in accordance with the present invention correspond to the didactic device as disclosed and claimed in pending U.S. patent application Ser. No. 153,342, filed May 27, 1980. The present didactic device serves as a specific learning aid for improving the penmanship and drawing skills of the user. To this end, the components of the didactic device are mounted within or on a housing 20 (FIGS. 2, 3 and 4) which is provided with command means to enable the user to select drawing or writing instructions and to actuate the imager 11 and the speech synthesis electronics 14 in an appropriate operating sequence for the didactic device. The command means may take the form of a keyboard 21 which is electrically connected to the microprocessor 13. The keyboard 21 may take any suitable form, and as shown in the illustrated embodiments of the didactic device of FIGS. 2 and 3 has a plurality of manually operable switches 22 for implementing various inputs to the didactic device during its operation as a learning aid in teaching penmanship and drawing skills. Preferably, the didactic device also includes a suitable display 23 which as shown in the illustrated embodiments of FIGS. 2, 3 and 4 may be mounted on the housing 20 of the didactic device on the top surface thereof along with the drawing surface 10 in adjoining relationship. However, it is within the spirit of this invention to omit the display 23 from the didactic device as a component thereof, as will be made clear by the description which follows hereinafter. The display 23 may be of any suitable type, such as a vacuum fluorescent display, a display formed by an array of light emitting diodes, a liquid crystal display, an electrochromic display, a plasma discharge display, etc. By way of a particular example, the display may take the form of the liquid crystal display device disclosed in pending U.S. patent application Ser. No. 942,226, filed Sept. 14, 1978, now U.S. Pat. No. 4,224,615 issued Sept. 23, 1980, wherein a keyboard arrangement is implemented into the display to enable the display to receive input information by selected actuation of one or more capacitive-type switches comprising the keyboard. In this type of liquid crystal display, the respective capacitive-type switches essentially involve no moving parts except for the inclusion of a flexible front substrate plate which is subject to deflection toward the spaced apart rear plate of the liquid crystal display in response to the application of the user's finger tip thereagainst. This depression of the flexible front substrate in a selected area by the application of the user's finger thereagainst reduces the thickness of liquid crystal material between the front substrate and rear wall for inputting information to the liquid crystal display by changing the impedance associated with the conductive segment of the liquid crystal display in the area corresponding to the depressed portion of the flexible front substrate. Where such a display 23 is included as a component of the didactic device in accordance with the present invention, the keyboard 21 with its plurality of manually actuatable switches 22 may be incorporated therewithin in the manner described in the aforesaid U.S. Pat. No. 4,224,615.

As to the respective switches 22 included on the keyboard 21, a number of keyswitch positions are utilized for mode keys, such as an on/off mode key, an instruction mode key, an interaction mode key, an imager actuation mode key, a critique analysis mode key, a display actuation mode key, etc.

Figure 2:
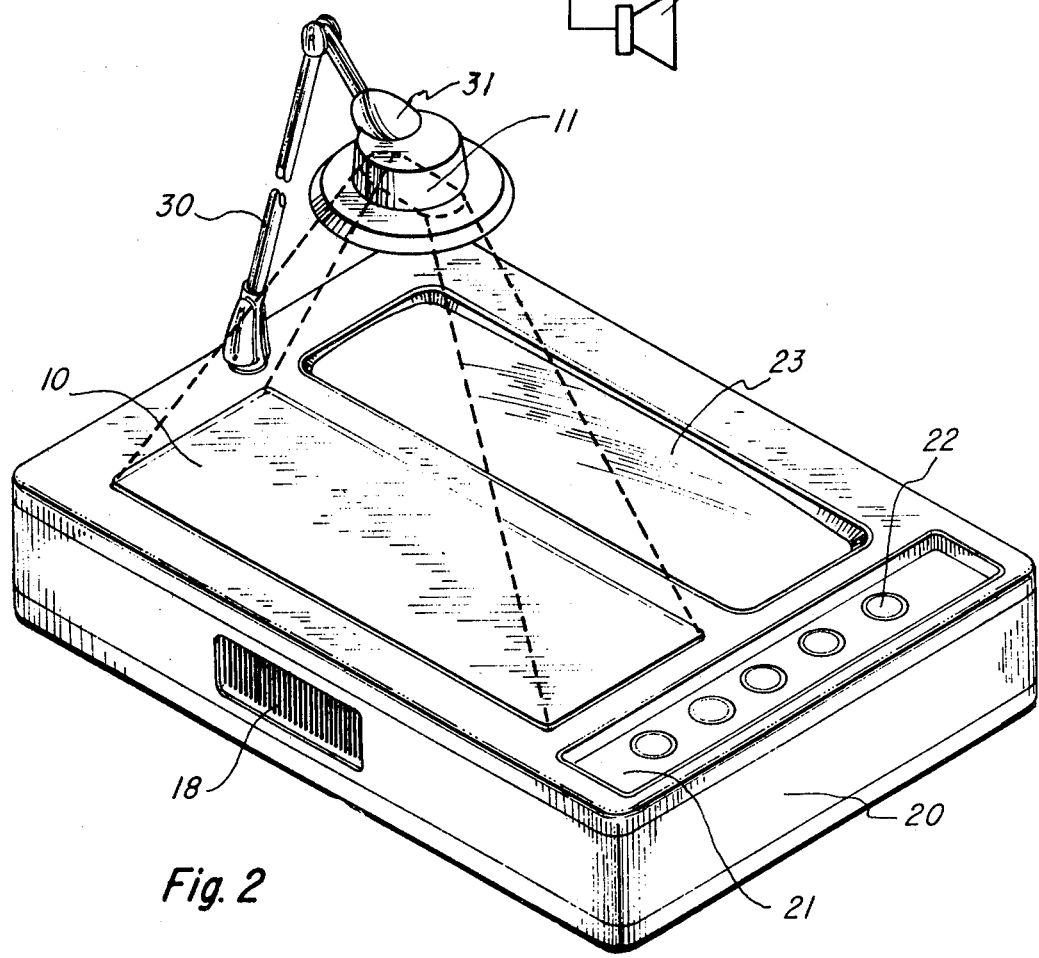
FIG. 2 is a perspective view of one embodiment of the didactic device as illustrated in block diagram form in FIG. 1.

The didactic device may be battery-powered or powered from a source of external electrical power, such as 120 volt alternating current line, as desired. The housing 20 may be of any suitable material, one such suitable material being injection molded plastic. By way of example, three embodiments of a didactic device comprising the components illustrated in block diagram form in FIG. 1 are respectively shown in FIGS. 2, 3 and 4. In FIG. 2, the optical imager 11 of the optical character recognition sub-system is mounted above the top surface of the housing 20 on which the drawing surface 10 and the display 23 are disposed. To this end, a mounting bracket for the optical imager 11 is provided which comprises an upright tubular standard or rod 30 affixed to the top surface of the housing 20 and extending vertically upwardly therefrom. An imager-carrying hood or casing 31 is swivelly mounted atop the upright rod 30. Electrical conductors connecting the optical imager 11 to the microprocessor 13 via the matrix RAM 12 may extend through the tubular rod 30 within the interior of the housing 20 where the microprocessor 13 is preferably located. The swivelly-mounted hood or casing 31 may further be provided with an on-off switch (not shown) for actuating the optical imager 11 carried thereby. It will be understood that the hood 31 is manipulated by the user of the didactic device in order to position the optical imager 11 carried thereby in registration with the drawing surface 10 as disposed on the top surface of the housing 20. Thus, the optical imager 11 includes the entire surface area of the drawing surface 10 within its field of view, thereby being able to see whatever characters or indicia are drawn thereon so as to generate signal output data indicative of the configuration of the written or drawn indicia.

Figure 3:
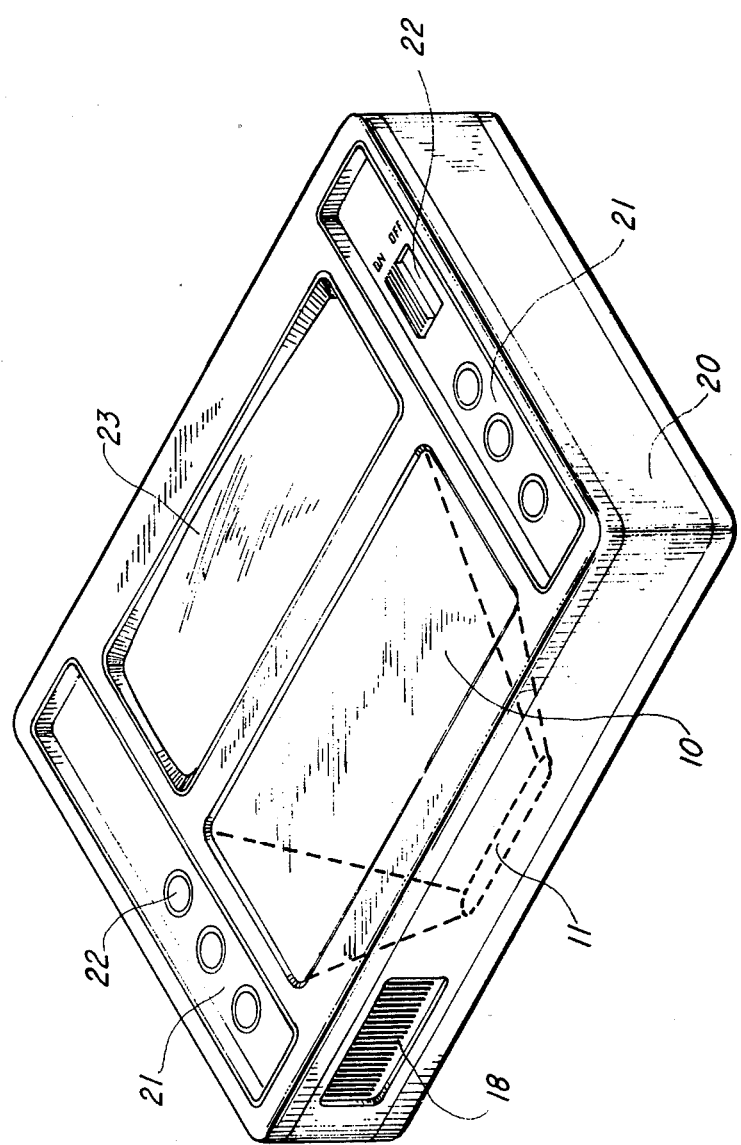
FIG. 3 is a perspective view of another embodiment of the didactic device as illustrated in block diagram form in FIG. 1.
Figure 4:
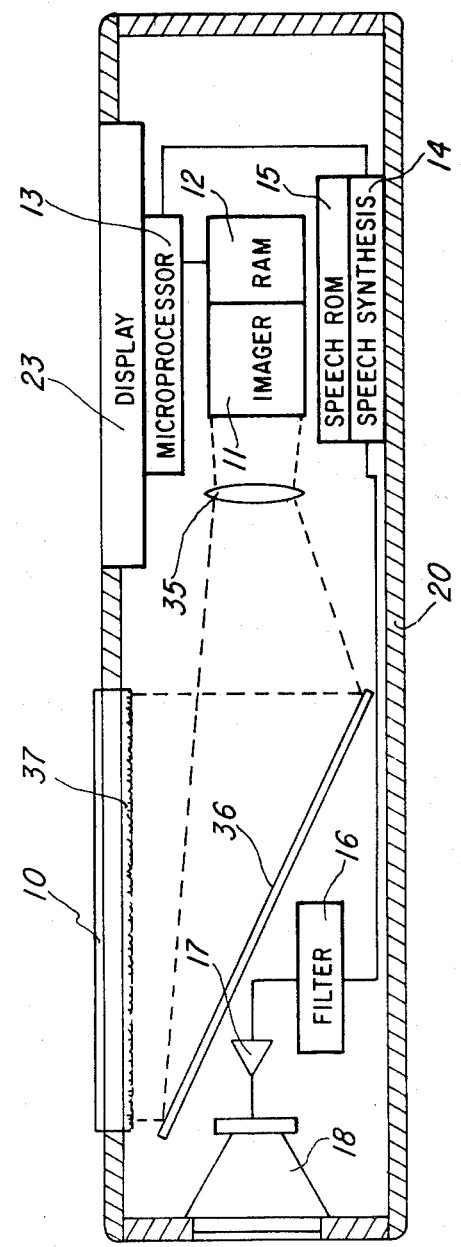
FIG. 4 is a sectional view, partially diagrammatic in form, of another embodiment of the didactic device in accordance with the present invention.

The embodiment of the didactic device illustrated in FIG. 2 locates the optical imager 11 above the drawing surface 10 and externally of the housing 20 of the didactic device. In the embodiments shown in FIGS. 3 and 4, the optical imager 11 is located within the housing 20 and arranged below the top surface thereof so as to include within its field of view the entire surface area of the drawing surface 10. In the embodiment of FIG. 3, the optical imager 11 is mounted within the housing 20 directly below the drawing surface 10 so as to be in registration therewith. In the embodiment of FIG. 4, the optical imager 11 is located within the housing 20 in off-set relationship with respect to the drawing surface 10. In this instance, a simple optical system is operably interposed between the drawing surface 10 and the imager 11 so as to bring the field of view of the imager 11 into registration with the drawing surface 10. To this end, the optical system may comprise a lens 35 and a planar reflecting mirror 36 arranged within the housing 20 in spaced relationship, with the lens 35 being interposed between the mirror 36 and the imager 11. The mirror 36 is positioned angularly in a manner enabling an image of the entire surface area of the drawing surface 10 to be reflected from the mirror 36 for viewing by the imager 11 via the focusing lens 35. Further, the drawing surface 10 may be provided with a so-called Fresnel lens 37 of plastic material which is characterized by having an array of symmetrical protuberances or bumps on the back surface thereof exposed to the reflecting mirror 36. The Fresnel lens 37 is a relatively inexpensive lens structure suitable for transmitting the written or drawn indicia on the drawing surface 10 to the reflecting surface of the mirror 36 with adequate resolution to permit suitable analysis as hereinafter described.

In operating the didactic device as constructed in accordance with the present invention, the user "turns on" or activates the didactic device by depressing a push button switch 22 or otherwise actuating a keyswitch position on the keyboard 21. Then, the user by depressing an instruction mode key 22 activates the speech synthesis sub-system 14 or the display 23 or both via the microprocessor 13 to provide audible and/or visual instructions to the user for writing or drawing a specific character, symbol, object or indicia on the drawing surface 10. When the user has completed the assignment as determined via actuation of the instruction mode key by drawing or writing on the drawing surface 10, the user then operates an imager actuation mode key which energizes the optical character recognition sub-system of the didactic device. Thus, the indicia appearing on the drawing surface 10 as written or drawn by the user is exposed to the field of view of the imager 11. The imager 11 generates a signal output which is received by the RAM 12, the contents of the RAM 12 being a digital image of the image as received on the viewing face of the imager 11 which corresponds to the written or drawn indicia on the drawing surface 10. Thereafter, the microprocessor 13 analyses and/or verifies the indicia appearing on the drawing surface 10 in relation to the appropriate response to the specific selected instruction as audibly and/or visually provided to the user previously upon activation of the instruction mode key. The analysis of the written or drawn indicia on the drawing surface 10 by the character recognition comparator of the microprocessor 13 is conducted along the lines described in the aforesaid pending U.S. patent application Ser. No. 153,342 filed May 27, 1980. In the present instance, it is merely necessary to compare the indicia drawn by the user on the drawing surface 10 with a specific data signature contained within the firmware of the RAM of the microprocessor 13 which corresponds to the proper response to the particular instructions selected for verification purposes. The user then activates a critique analysis mode key which produces an audible verbal critique via the speech synthesis sub-system and/or a visual critique via the display 23 commenting upon the appropriateness of the writing or drawing provided by the user in response to the specific instruction.

Figure 5A:
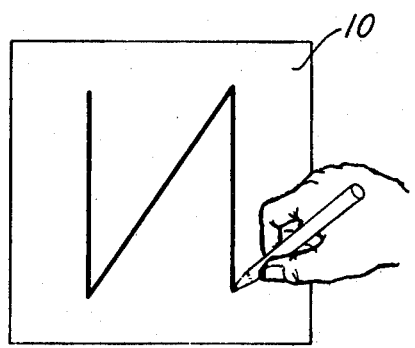
FIGS. 5a–5d are diagrams illustrating respective writings or indicia drawn by a user of the didactic device of FIG. 1 in response to prompting instructions provided thereby.
Figure 5B:
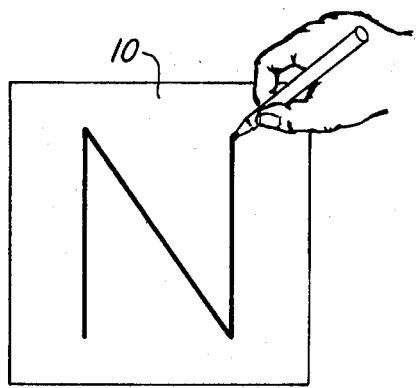
Figure 5C:
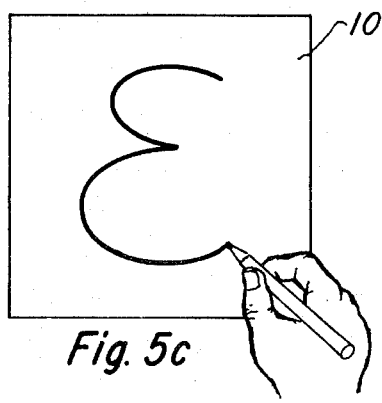
Figure 5D:
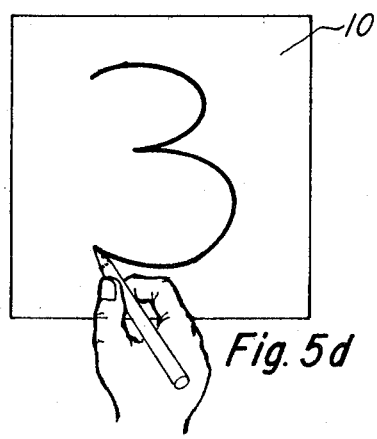

For example, referring to FIGS. 5a-5d, assume with respect to FIGS. 5a and 5b that the selected instruction provided by the speech synthesis sub-system or the display 23 or both upon activation of the instruction mode key by the user requested the user to print the letter "N". If the user in carrying out this specific instruction produced an indicia, such as illustrated in FIG. 5a, the subsequent audible critique provided by the speech synthesis sub-system of the didactic device might have been: "You have printed the 'N' backward. Try again." This verbal critique could be followed up by a visual showing on the display 23 of the correct response to the particular selected instruction of a properly printed "N". If the user had written the "N" as illustrated in FIG. 5b, the verbal critique by the speech synthesis sub-system of the didactic device might have been: "Correct. That is a well-drawn 'N'". Similarly, the same description is applicable to FIGS. 5c and 5d, where the selected instruction to the user, as audibilized by the speech synthesis sub-system was: "Draw the number '3'".

As to the keyboard 21, it will be understood that a number of variations are possible with respect to the key switch positions provided thereon and the manner in which the user is taken through the procedure of being requested verbally by the didactic device to write or draw some particular indicia in response to a selected instruction. Thus, there may be so-called visual prompters appearing on the display 23 to step-through the complete operating sequence of the didactic device. Additionally, a panel having selectively lighted portions thereof labeled "wait" and "go to next step" may be provided to facilitate the proper sequential operation of the respective mode keys provided on the keyboard 21. For example, after activation of the imager actuation mode key, the "wait" portion of the panel may become illuminated. When the imager 11 has viewed the drawing surface 10, and the indicia information has been extracted by the microprocessor 13, the "wait" panel may go dark, and the "go to next step" panel may then become illuminated.

It will be understood that the degree of sophistication of the RAM of the microprocessor 13 may be such as to include simple drawings in addition to "letters" and "arabic numerals" in the firmware thereof as data signatures unique to these respective indicia. For example, the objects depicted in the drawings of the aforesaid U.S. patent application Ser. No. 153,342 filed May 27, 1980 may be included as contour "data signatures" stored as firmware in the RAM of the microprocessor 13. Thus, the audible instructions can be expanded to include instructions to the user to draw simple objects, such as a "circle", a "rectangle", a "star", etc., with appropriate critical comment being forthcoming upon analysis and verification of the object drawn by the user on the drawing surface 10 with respect to the specific drawing instruction.

Although separate ROMs have been described for the microprocessor 13 and the speech synthesis electronics 14, the didactic device could be constructed to include only a single ROM serving both the microprocessor 13 and the speech synthesis electronics 14. In the latter instance, the firmware comprising the contour "data signatures" could be stored in the ROM along with the ROM program under which the microprocessor 13 operates, and the vocabulary for the speech synthesis electronics 14. Further in this respect, the ROM or ROMs may take the form of plug-in package modules of the type disclosed and claimed in U.S. Pat. No. 4,153,937 Poland issued May 8, 1979. It will be understood that a plurality of such plug-in ROM modules offering a variety of learning experiences to improve writing and drawing skills may be provided with the didactic device in accordance with the invention, wherein one such ROM module may be selectively plugged into the microprocessor 13 at a time.

Finally, it is contemplated that the speech synthesizing system may be omitted from the didactic device in its simplest aspect such that writing or drawing instructions would be visually provided to the user, via the display 23 or by individual flash cards. In this instance, the user would comply with the selected instruction by attempting to copy the "letter", "arabic numeral" or "object" onto the drawing surface 10, with the critique of the "copied indicia" appearing visually on the display 23.

It will be understood that various modifications in the specific embodiments of the present invention which have been described and illustrated may be made by those skilled in the art without departing from the scope and principle of the invention as expressed in the appended claims.

What is claimed is:

1. A didactic device for providing a learning experience and/or entertainment, said didactic device comprising:

command means for instructing the user to perform a drawing task;

a drawing surface operationally independent of said command means and defining a drawing area free of markings relating to the performance of the drawing task on which the user is to execute the instructions provided by said command means by drawing indicia thereon;

imager means having a field of view exposed to the drawing area of said drawing surface for viewing indicia as drawn on said drawing surface within said drawing area by the user in response to instructions from said command means and providing a signal data output indicative of the appearance of the indicia;

memory means connected to the output of said imager means for receiving the signal data output therefrom and arranging the signal data output in a matrix array of signals;

data processor means having memory storage means providing data signatures of at least a plurality of indicia configurations, said processor means being connected to the output of said memory means and including examination instructions for comparing the matrix array of signals provided by the signal data output of said imager means with the data signatures of said memory storage means so as to provide an analytical signal output determinative of the comparative analysis between the matrix array of signals provided by said signal data output of said imager means and the data signature of said memory storage means having the closest identity with said signal data output;

speech synthesizer means connected to the output of said data processor means for receiving the analytical signal output thereof and generating an audio signal output representative of human speech and reflective of the content of the analytical signal output from said data processor means and critiquing the quality and character of the indicia drawn by the user in relation to the particular instructions provided by said command means; and speaker means connected to said speech synthesizer means for converting said audio signal output received therefrom to audible human speech which critically discusses the user's drawing response in relation to the instructions provided by said command means.

2. A didactic device as set forth in claim 1, wherein said command means is operably connected to said speech synthesizer means, and said speech synthesizer means being responsive to a selected instruction signal from said command means to generate an audio signal output representative of human speech and reflective of the content of the selected instruction signal so that said speaker means will provide audible human speech as vocal instructions to the user corresponding to the selected instruction signal from said command means.

3. A didactic device as set forth in claim 1, wherein said command means comprises a keyboard having a plurality of manually operable switches provided thereon for respectively instituting different instructions upon being actuated, said keyboard being operably connected to said data processor means such that selection of one of said plurality of switches thereon by the user enables a particular instruction to be transmitted to the user relating to the performance of a drawing task.

4. A didactic device as set forth in claim 1, further including display means operably connected to said data processor means for visibly indicating relevant information to the user.

5. A didactic device as set forth in claim 4, wherein said display means is operably associated with said speech synthesizer means for providing to the user a visual representation of proper indicia in response to a specific instruction from said command means for performing a drawing task.

6. A didactic device as set forth in claim 5, wherein the visual representation of proper indicia appearing on said display means is accompanied by audible vocal comment from said speaker means in response to the audio signal output from said speech synthesizer means reflective of the comparison between the indicia drawn on said drawing surface by the user and the proper indicia appearing on said display means.

7. A didactic device as set forth in claim 1, wherein said drawing surface is provided by a sheet of paper.

8. A didactic device for providing a learning experience and/or entertainment, said didactic device comprising:
   a housing;
   a keyboard disposed on a surface of said housing and including a plurality of manually operable switches provided thereon for respectively instituting different instructions upon being actuated;
   a drawing surface provided on a surface of said housing and defining a drawing area on which a user is to execute the instructions as determined by selective actuation of switches on said keyboard by drawing indicia on said drawing surface within said drawing area;
   imager means operably associated with said housing and having a field of view exposed to the drawing area of said drawing surface for viewing indicia as drawn on said drawing surface within said drawing area by the user and providing a signal data output indicative of the appearance of the indicia;
   memory means connected to the output of said imager means for receiving the signal data output therefrom and arranging the signal data output in a matrix array of signals;
   data processor means mounted within said housing and having memory storage means providing data signatures of at least a plurality of indicia configurations, said processor means being connected to the output of said memory means and including examination instructions for comparing the matrix array of signals provided by the signal data output of said imager means with the data signatures of said memory storage means so as to provide an analytical signal output determinative of the comparative analysis between the matrix array of signals provided by said signal data output of said imager means and the data signature of said memory storage means having the closest identity with said signal data output;
   speech synthesizer means mounted within said housing and connected to the output of said data processor means for receiving the analytical signal output thereof and generating an audio signal output representative of human speech and reflective of the content of the analytical signal output from said data processor means and critiquing the quality and character of the indicia drawn by the user in relation to the particular instructions as determined by the actuated switches on said keyboard; and
   speaker means mounted within said housing and connected to said speech synthesizer means for converting said audio signal output received therefrom to audible human speech which critically discusses the user's drawing response in relation to the instructions as determined by the actuated switches on said keyboard.

9. A didactic device as set forth in claim 8, wherein said keyboard and said drawing surface are disposed on the top surface of said housing.

10. A didactic device as set forth in claim 9, further including mounting means for said imager means disposed on said housing and locating said imager means above the top surface of said housing in registration with said drawing surface.

11. A didactic device as set forth in claim 9, wherein said imager means is mounted within said housing and arranged below said top surface thereof.

12. A didactic device as set forth in claim 9, further including display means disposed on the top surface of said housing and operably connected to said data processor means for visibly indicating relevant information to the user.

13. A didactic device for providing a learning experience and/or entertainment, said didactic device comprising:
   command means for instructing the user to perform a drawing task;
   a drawing surface operationally independent of said command means and defining a drawing area free of markings relating to the performance of the drawing task on which the user is to execute the instructions provided by said command means by drawing indicia thereon;
   imager means having a field of view exposed to the drawing area of said drawing surface for viewing indicia as drawn on said drawing surface within said drawing area by the user in response to instructions from said command means and providing a signal data output indicative of the appearance of the indicia;
   memory means connected to the output of said imager means for receiving the signal data output therefrom and arranging the signal data output in a matrix array of signals;
   data processor means having memory storage means providing data signatures of at least a plurality of indicia configurations, said processor means being connected to the output of said memory means and including examination instructions for comparing the matrix array of signals provided by the signal data output of said imager means with the data signatures of said memory storage means so as to provide an analytical signal output determinative of the comparative analysis between the matrix array of signals provided by said signal data output of said imager means and the data signature of said memory storage means having the closest identity with said signal data output; and critique means operably connected to the output of said data processor means for receiving the analytical signal output thereof and providing a critical evaluation of the user's drawing response in relation to the instructions provided by said command means.

14. A didactic device as set forth in claim 13, wherein said critique means provides a visual critical evaluation of the user's drawing response.

15. A didactic device as set forth in claim 13, wherein said critique means provides an audible speech critical evaluation of the user's drawing response.

16. A didactic device for providing a learning experience and/or entertainment, said didactic device comprising:

command means for instructing the user to perform a drawing task;

a drawing surface operationally independent of said command means and defining a drawing area free of markings relating to the performance of the drawing task on which the user is to execute the instructions provided by said command means by drawing indicia thereon;

imager means having a field of view exposed to the drawing area of said drawing surface for viewing indicia as drawn on said drawing surface within said drawing area by the user in response to instructions from said command means and providing a signal data output indicative of the appearance of the indicia;

data processor means having memory storage means providing data signatures of at least a plurality of indicia configurations, said processor means being operably connected to said imager means and including examination instructions for comparing the signal data output of said imager means with the data signatures of said memory storage means so as to provide an analytical signal output determinative of the comparative analysis between said signal data output of said imager means and the data signature of said memory storage means having the closes identity thereto; and critique means operably connected to the output of said data processor means for receiving the analytical signal output thereof and providing a critical evaluation of the user's drawing response in relation to the instructions provided by said command means.

17. A didactic device as set forth in claim 16, wherein said critique means provides a visual critical evaluation of the user's drawing response.

18. A didactic device as set forth in claim 16, wherein said critique means provides an audible speech critical evaluation of the user's drawing response.

19. A didactic device for providing a learning experience and/or entertainment, said didactic device comprising:

command means for instructing the user to perform a drawing task;

a drawing surface operationally independent of said command means and defining a drawing area free of markings relating to the performance of the drawing task on which the user is to execute the instructions provided by said command means by drawing indicia thereon;

imager means having a field of view exposed to the drawing area of said drawing surface for viewing indicia as drawn on said drawing surface within said drawing area by the user in response to instructions from said command means and providing a signal data output indicative of the appearance of the indicia;

data processor means having memory storage means providing data signatures of at least a plurality of indicia configurations, said processor means being operably connected to said imager means and including examination instructions for comparing the signal data output of said imager means with the data signatures of said memory storage means so as to provide an analytical signal output determinative of the comparative analysis between said signal data output of said imager means and the data signature of said memory storage means having the closest identity thereto;

speech synthesizer means connected to the output of said data processor means for receiving the analytical signal output thereof and generating an audio signal output representative of human speech and reflective of the content of the analytical signal output from said data processor means and critiquing the quality and character of the indicia drawn by the user in relation to the particular instructions provided by said command means; and speaker means connected to said speech synthesizer means for converting said audio signal output received therefrom to audible human speech which critically discusses the user's drawing response in relation to the instructions provided by said command means.

20. A didactic device for providing a learning experience and/or entertainment, said didactic device comprising:

command means for instructing the user to perform a drawing task;

a drawing surface operationally independent of said command means and defining a drawing area free of markings relating to the performance of the drawing task on which the user is to execute the instructions provided by said command means by drawing indicia thereon;

a non-electrical writing instrument associated with said drawing surface and adapted to be employed by the user in drawing indicia on said drawing surface;

imager means having a field of view exposed to the drawing area of said drawing surface for viewing indicia as drawn on said drawing surface within said drawing area by the user in response to instructions from said command means and providing a signal data output indicative of the appearance of the indicia;

memory means connected to the output of said imager means for receiving the signal data output therefrom and arranging the signal data output in a matrix array of signals;

data processor means having memory storage means providing data signatures of at least a plurality of indicia configurations, said processor means being connected to the output of said memory means and including examination instructions for comparing the matrix array of signals provided by the signal data output of said imager means with the data signatures of said memory storage means so as to provide an analytical signal output determinative of the comparative analysis between the matrix array of signals provided by said signal data output of said imager means and the data signature of said memory storage means having the closest identity with said signal data output;

speech synthesizer means connected to the output of said data processor means for receiving the analytical signal output thereof and generating an audio signal output representative of human speech and reflective of the content of the analytical signal output from said data processor means and critiquing the quality and character of the indicia drawn by the user in relation to the particular instructions provided by said command means; and speaker means connected to said speech synthesizer means for converting said audio signal output received therefrom to audible human speech which critically discusses the user's drawing response in relation to the instructions provided by said command means.

21. A didactic device for providing a learning experience and/or entertainment, said didactic device comprising:

a housing;

a keyboard disposed on a surface of said housing and including a plurality of manually operable switches provided thereon for respectively instituting different instructions upon being actuated;

a drawing surface provided on a surface of said housing and defining a drawing area on which a user is to execute the instructions as determined by selective actuation of switches on said keyboard by drawing indicia on said drawing surface within said drawing area;

a non-electrical writing instrument associated with said drawing surface and adapted to be employed by the user in drawing indicia on said drawing surface;

imager means operably associated with said housing and having a field of view exposed to the drawing area of said drawing surface for viewing indicia as drawn on said drawing surface within said drawing area by the user and providing a signal data output indicative of the appearance of the indicia;

memory means connected to the output of said imager means for receiving the signal data output therefrom and arranging the signal data output in a matrix array of signals;

data processor means mounted within said housing and having memory storage means providing data signatures of at least a plurality of indicia configurations, said processor means being connected to the output of said memory means and including examination instructions for comparing the matrix array of signals provided by the signal data output of said imager means with the data signatures of said memory storage means so as to provide an analytical signal output determinative of the comparative analysis between the matrix array of signals provided by said signal data output of said imager means and the data signature of said memory storage means having the closest identity with said signal data output;

speech synthesizer means mounted within said housing and connected to the output of said data processor means for receiving the analytical signal output thereof and generating an audio signal output representative of human speech and reflective of the content of the analytical signal output from said data processor means and critiquing the quality and character of the indicia drawn by the user in relation to the particular instructions as determined by the actuated switches on said keyboard; and speaker means mounted within said housing and connected to said speech synthesizer means for converting said audio signal output received therefrom to audible human speech which critically discusses the user's drawing response in relation to the instructions as determined by the actuated switches on said keyboard.

22. A didactic device for providing a learning experience and/or entertainment, said didactic device comprising:

command means for instructing the user to perform a drawing task;

a drawing surface operationally independent of said command means and defining a drawing area free of markings relating to the performance of the drawing task on which the user is to execute the instructions provided by said command means by drawing indicia thereon;

a non-electrical writing instrument associated with said drawing surface and adapted to be employed by the user in drawing indicia on said drawing surface;

imager means having a field of view exposed to the drawing area of said drawing surface for viewing indicia as drawn on said drawing surface within said drawing area by the user in response to instructions from said command means and providing a signal data output indicative of the appearance of the indicia;

memory means connected to the output of said imager means for receiving the signal data output therefrom and arranging the signal data output in a matrix array of signals;

data processor means having memory storage means providing data signatures of at least a pluralty of indicia configurations, said processor means being connected to the output of aid memory means and including examination instructions for comparing the matrix array of signals provided by the signal data output of said imager means with the data signatures of said memory storage means so as to provide an analytical signal output determinative of the comparative analysis between the matrix array of signals provided by said signal data output of said imager means and the data signature of said memory storage means having the closest identity with said signal data output; and critique means operably connected to the output of said data processor means for receiving the analytical signal output thereof and providing a critical evaluation of the user's drawing response in relation to the instructions provided by said command means.

23. A didactic device for providing a learning experience and/or entertainment, said didactic device comprising:

command means for instructing the user to perform a drawing task;

a drawing surface operationally independent of said command means and defining a drawing area free of markings relating to the performance of the drawing task on which the user is to execute the instructions provided by said command means by drawing indicia thereon;

a non-electrical writing instrument associated with said drawing surface and adapted to be employed by the user in drawing indicia on said drawing surface;

imager means having a field of view exposed to the drawing area of said drawing surface for viewing indicia as drawn on said drawing surface within said drawing area by the user in response to instructions from said command means and providing a signal data output indicative of the appearance of the indicia;

data processor means having memory storage means providing data signatures of at least a plurality of indicia configurations, said processor means being operably connected to said imager means and including examination instructions for comparing the signal data output of said imager means with the data signatures of said memory storage means so as to provide an analytical signal output determinative of the comparative analysis between said signal data output of said imager means and the data signature of said memory storage means having the closest identity thereto; and critique means operably connected to the output of said data processor means for receiving the analytical signal output thereof and providing a critical evaluation of the user's drawing response in relation to the instructions provided by said command means.

24. A didactic device for providing a learning experience and/or entertainment, said didactic device comprising:

command means for instructing the user to perform a drawing task;

a drawing surface operationally independent of said command means and defining a drawing area free of markings relating to the performance of the drawing task on which the user is to execute the instructions provided by said command means by drawing indicia thereon;

a non-electrical writing instrument associated with said drawing surface and adapted to be employed by the user in drawing indicia on said drawing surface;

imager means having a field of view exposed to the drawing area of said drawing surface for viewing indicia as drawn on said drwing surface within said drawing area by the user in response to instructions from said command means and providing a signal data output indicative of the appearance of the indicia;

data processor means having memory storage means providing data signatures of at least a plurality of indicia configurations, said processor means being operably connected to said imager means and including examination instructions for comparing the signal data output of said imager means with the data signatures of said memory storage means so as to provide an analytical signal output determinative of the comparative analysis between said signal data output of said imager means and the data signature of said memory storage means having the closest identity thereto;

speech synthesizer means connected to the output of said data processor means for receiving the analytical signal output thereof and generating an audio signal output representative of human speech and reflective of the content of the analytical signal output from said data processor means and critiquing the quality and character of the indicia drawn by the user in relation to the particular instructions provided by said command means; and speaker means connected to said speech synthesizer means for converting said audio signal output received therefrom to audible human speech which critically discusses the user's drawing response in relation to the instructions provided by said command means.

* * * * *